(12) United States Patent
Tajima et al.

(10) Patent No.: US 10,889,194 B2
(45) Date of Patent: Jan. 12, 2021

(54) CONTACT CHARGING METHOD AND CONTACT CHARGING SYSTEM FOR ELECTRIC VEHICLE

(71) Applicant: HONDA MOTOR CO., LTD., Tokyo (JP)

(72) Inventors: Takamitsu Tajima, Wako (JP); Yasuji Shibahata, Wako (JP); Wataru Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/254,748

(22) Filed: Jan. 23, 2019

(65) Prior Publication Data

US 2019/0152337 A1 May 23, 2019

Related U.S. Application Data

(63) Continuation of application No. 15/034,481, filed as application No. PCT/JP2013/079990 on Nov. 6, 2013, now Pat. No. 10,227,013.

(51) Int. Cl.
*B60L 53/14* (2019.01)
*B60L 5/08* (2006.01)
(Continued)

(52) U.S. Cl.
CPC .................. *B60L 53/14* (2019.02); *B60L 5/08* (2013.01); *B60L 5/36* (2013.01); *B60L 5/40* (2013.01);
(Continued)

(58) Field of Classification Search
CPC ... B60M 1/34; H02G 5/04; B60L 5/06; B60L 11/1818; B60L 11/1827; B60L 2230/12;
(Continued)

(56) References Cited

U.S. PATENT DOCUMENTS 770,158 A   9/1904 Buckley
1,472,649 A  10/1923 Grace
(Continued)

FOREIGN PATENT DOCUMENTS

DE   2144049 A1   3/1973
EP   2284635 A1   2/2011
(Continued)

OTHER PUBLICATIONS

Related co-pending U.S. Appl. No. 16/254,737.
(Continued)

*Primary Examiner* — Mark T Le
(74) *Attorney, Agent, or Firm* — Westerman, Hattori, Daniels & Adrian, LLP

(57) ABSTRACT

During travel of the electric vehicle, the charging arm is extended in the vehicle width direction, a positive electrode overhead line of the power supply device and a positive electrode power reception unit of the charging arm are brought into contact at the same time that a negative electrode overhead line of the power supply device and a negative electrode power reception unit of the charging arm are brought into contact, and a power storage device for driving the electric vehicle is charged. A charging head that is the tip section of the charging arm is held within a V-shaped groove to which the positive electrode overhead line and the negative electrode overhead line are attached, thereby minimizing the loss of contact even if the charging arm shakes in the vertical direction as a result of the condition of the road surface, brake operation, or the like.

8 Claims, 15 Drawing Sheets

(51) Int. Cl.
  *B60L 5/36* (2006.01)
  *B60L 5/40* (2006.01)
  *B60L 53/35* (2019.01)
  *B60L 53/18* (2019.01)
  *B60L 53/16* (2019.01)
  *B60M 1/34* (2006.01)

(52) U.S. Cl.
  CPC .............. *B60L 53/16* (2019.02); *B60L 53/18* (2019.02); *B60L 53/35* (2019.02); *B60M 1/34* (2013.01); *Y02T 10/70* (2013.01); *Y02T 10/7072* (2013.01); *Y02T 90/12* (2013.01); *Y02T 90/14* (2013.01)

(58) Field of Classification Search
  CPC ...... B60L 5/08; B60L 5/36; B60L 5/40; B60L 11/18; B60L 5/16; Y02T 10/7005; Y02T 10/7088; Y02T 90/121; Y02T 90/125; Y02T 90/14; B60R 2011/0082; B60R 22/24; B60F 1/00; B60F 2301/02; B60F 2301/04; B60F 2301/00
  See application file for complete search history.

(56) References Cited

U.S. PATENT DOCUMENTS

| | | | | |
|---|---|---|---|---|
| 3,405,240 | A | * | 10/1968 | Kilburg ................ H01R 41/00 191/59.1 |
| 3,723,672 | A | | 3/1973 | Payen |
| 3,786,762 | A | * | 1/1974 | Corkum .................... B60L 5/38 104/288 |
| 4,234,065 | A | | 11/1980 | Uozumi et al. |
| 4,464,546 | A | * | 8/1984 | Culver ..................... B60L 5/08 191/49 |
| 4,572,929 | A | | 2/1986 | Nitschke et al. |
| 4,791,871 | A | | 12/1988 | Mowll |
| 5,148,898 | A | * | 9/1992 | Musachio ................ B60M 1/10 180/2.1 |
| 5,881,650 | A | | 3/1999 | Gersemsky et al. |
| 6,123,027 | A | | 9/2000 | Suyama et al. |
| 6,152,273 | A | | 11/2000 | Kilkenny |
| 2013/0220757 | A1 | | 8/2013 | Reiser et al. |

FOREIGN PATENT DOCUMENTS

| | | |
|---|---|---|
| JP | 47-30019 A | 11/1972 |
| JP | 48-52207 U | 7/1973 |
| JP | 48-30335 Y1 | 9/1973 |
| JP | 49-32312 A | 3/1974 |
| JP | 52-27109 A | 3/1977 |
| JP | 52-44912 A | 4/1977 |
| JP | 52-57612 A | 5/1977 |
| JP | 55-25753 U | 2/1980 |
| JP | S55-17264 A | 2/1980 |
| JP | 56-9802 U | 1/1981 |
| JP | S57-125102 U | 8/1982 |
| JP | 58-133101 A | 8/1983 |
| JP | 2001-78366 A | 3/2001 |
| JP | 2007-028487 A | 2/2007 |
| JP | 2007-046690 A | 2/2007 |
| JP | 2009-213337 A | 9/2009 |
| JP | 2010-187471 A | 8/2010 |
| JP | 2011-250498 A | 12/2011 |
| JP | 2013-233037 A | 11/2013 |
| WO | 2011/142421 A1 | 11/2011 |
| WO | 2012/188422 A1 | 9/2012 |

OTHER PUBLICATIONS

Related co-pending U.S. Appl. No. 16/254,756.
International Search Report dated Dec. 3, 2013, issued in counterpart International Application No. PCT/JP2013/079990 (2 pages).
Office Action dated Oct. 25, 2016, issued in counterpart Japanese Application No. 2012-103557, with English translation (5 pages).
Extended European Search Report dated Dec. 3, 2018, issued in counterpart application No. 18186958.7. (9 pages).
Office Action dated May 10, 2018 issued in U.S. Appl. No. 15/034,481.
Notice of Allowance dated Oct. 24, 2018 issued in U.S. Appl. No. 15/034,481.
Non-Final Office Action dated Apr. 22, 2020, issued in U.S. Appl. No. 16/254,756 (7 pages).
Non-Final Office Action dated Apr. 13, 2020, issued in U.S. Appl. No. 16/254,737 (10 pages).
Final Office Action dated Sep. 1, 2020, issued in U.S. Appl. No. 16/254,756 (7 pages).

* cited by examiner

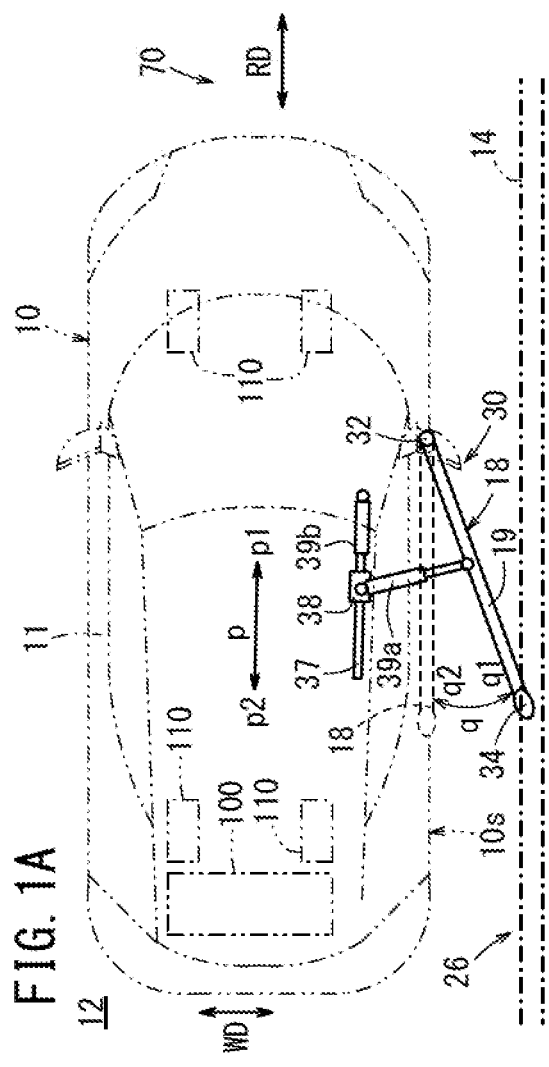
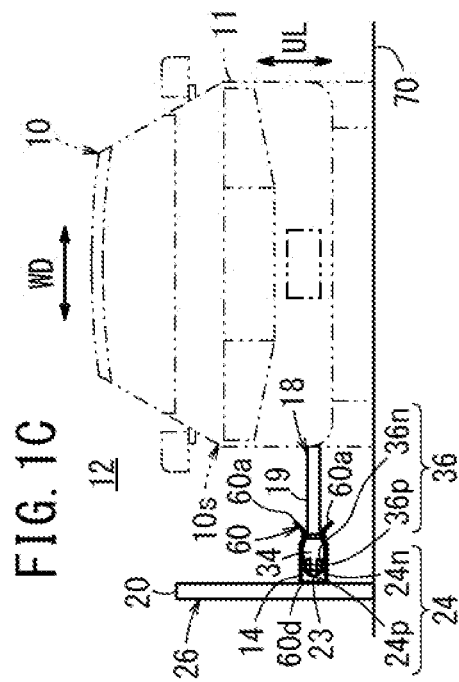
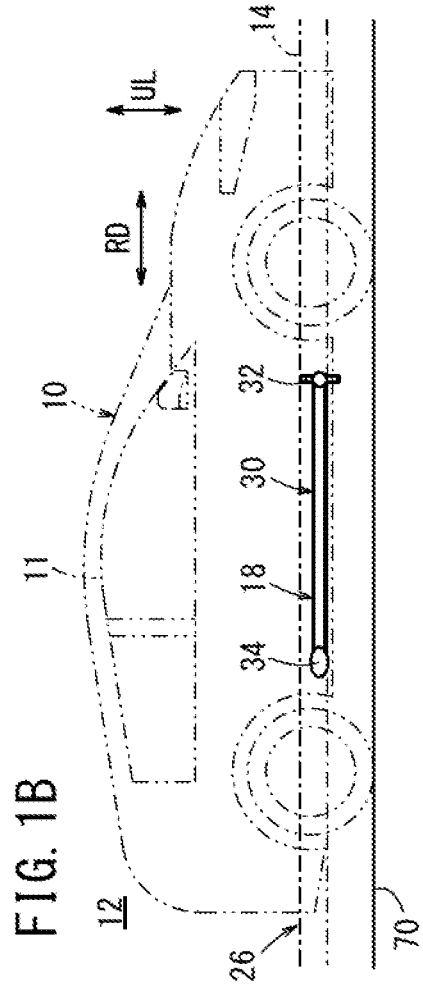

CONTACT CHARGING METHOD AND CONTACT CHARGING SYSTEM FOR ELECTRIC VEHICLE

This application is a continuation of U.S. application Ser. No. 15/034,481 filed on May 4, 2016, which is the National Stage of International Application No. PCT/JP2013/079990, filed on Nov. 6, 2013, the entire contents of which are incorporated herein by reference.

TECHNICAL FIELD

The present invention relates to a contact charging method and a contact charging system for an electric vehicle, which during traveling of the electric vehicle, charges an electrical storage device provided in the electric vehicle and which is used for driving by way of contact charging from an external power supply device.

BACKGROUND ART

Heretofore, a resonance-type non-contact charging (power supplying) system for a vehicle has been proposed in International Publication No. WO 2011/142421 pamphlet (hereinafter referred to as WO 2011/142421A).

SUMMARY OF INVENTION

With the resonance-type non-contact charging (power supplying) system proposed in WO 2011/142421A, as a result of carrying out transmission and reception of high frequency large scale power between a primary side resonator coil on an infrastructure side and a secondary side resonator coil on the side of an electric vehicle, problems occur in that it is likely for generation of external noise to be large, or for control of the power supply to become complex.

For resolving these problems, a contact charging system may be considered, which is constituted so as to bring a charging arm, which is provided on an electric vehicle, into contact with a power supplying device, which is disposed on an external member, during traveling of the electric vehicle, whereby an electrical storage device of the electric vehicle is charged from the power supplying device through the charging arm.

However, with such a contact charging system, when the electric vehicle, which is traveling while undergoing charging through the charging arm, swings or rocks in a upper and lower directions (pitching directions) due to road conditions or acceleration and braking operations or the like, contact between the charging arm and the power supplying device becomes unstable, which can lead to a situation in which contact cannot be assured.

The present invention has been devised taking into consideration the aforementioned problems, and has the object of providing a contact charging method and a contact charging system for an electric vehicle in which, during traveling while carrying out contact charging between a power supplying device and the electric vehicle through a charging arm of the electric vehicle, even if the electric vehicle undergoes swinging motion in upper and lower directions, loss of assurance of the contact state is suppressed, together with enabling a reduction in size of the electric vehicle charging system.

A contact charging method for an electric vehicle according to the present invention comprises the steps of providing a power supplying device, which includes a power line retaining part in which a V-shaped groove is provided that faces toward a side portion of the electric vehicle and is formed to open in upper and lower directions of the electric vehicle and to extend in a running direction of the electric vehicle, and in which a positive electrode power line on one inner surface and a negative electrode power line on another inner surface of the V-shaped groove of the power line retaining part are fixed to the power line retaining part respectively along the running direction and at positions to maintain an insulation distance mutually therebetween, and causing a charging arm, which is accommodated in the side portion of the electric vehicle and includes a positive electrode power reception unit and a negative electrode power reception unit, which are provided on a distal end thereof and are disposed so as to face the corresponding positive electrode power line and the corresponding negative electrode power line of the power supplying device, to extend out in a vehicle widthwise direction, and to bring into contact simultaneously the positive electrode power line of the power supplying device and the positive electrode power reception unit of the charging arm, and the negative electrode power line of the power supplying device and the negative electrode power reception unit of the charging arm, and charging an electrical storage device for driving of the electric vehicle.

A contact charging system for an electric vehicle according to the present invention is constituted from a power supplying device, and the electric vehicle equipped with an electrical storage device for driving to which power from the power supplying device is supplied, wherein the power supplying device is of a structure that includes a power line retaining part in which a V-shaped groove is provided that faces toward a side portion of the electric vehicle and is formed to open in upper and lower directions of the electric vehicle and to extend in a running direction of the electric vehicle, and in which a positive electrode power line on one inner surface and a negative electrode power line on another inner surface of the V-shaped groove of the power line retaining part are fixed to the power line retaining part respectively along the running direction and at positions to maintain an insulation distance mutually therebetween, and the electric vehicle is of a structure comprising a charging arm configured to extend out in a vehicle widthwise direction, which is accommodated in the side portion of the electric vehicle and includes a positive electrode power reception unit and a negative electrode power reception unit, which are provided on a distal end thereof and are disposed so as to face the corresponding positive electrode power line and the corresponding negative electrode power line of the power supplying device, wherein during charging, the charging arm is extended out in the vehicle widthwise direction, and the positive electrode power line of the power supplying device and the positive electrode power reception unit of the charging arm, and the negative electrode power line of the power supplying device and the negative electrode power reception unit of the charging arm are placed in contact simultaneously, and the electrical storage device is charged.

According to the present invention, a configuration is provided such that, when the electrical storage device for driving, which is mounted in the electric vehicle, is charged during traveling, by causing the charging arm, which is provided on the vehicle body and on which the positive electrode power reception unit and the negative electrode power reception unit are disposed above and below on the distal end thereof, to extend out in a lateral direction of the vehicle body, and to be placed in contact with the power line that is disposed along the running direction of a travel path, the positive electrode power line of the power supplying device and the positive electrode power reception unit of the charging arm along with the negative electrode power line of the power supplying device and the negative electrode power reception unit of the charging arm, wherein the positive electrode power line is fixed to one inner surface and the negative electrode power line is fixed to another inner surface of the V-shaped groove that faces toward the side portion of the electric vehicle and is formed to open in upper and lower directions of the electric vehicle and to extend along the running direction of the electric vehicle, are brought into contact simultaneously, and the electrical storage device for driving of the electric vehicle is charged. Therefore, even if the charging arm swings or rocks in upper and lower directions due to road conditions or braking operations or the like, the distal end part of the charging arm is retained inside the V-shaped groove, and contact is prevented from not being secured.

Further, because the positive electrode power line and the negative electrode power line are fixed above and below on inner surfaces of the V-shaped groove, both the power supplying device and the charging arm can be made smaller in scale, and as a result, it is possible for the contact charging system as a whole to be made smaller in scale.

Since the power supplying device carries out charging by way of contact charging, in comparison with a resonance-type non-contact charging system, generation of external noise is greatly reduced, and the power supplying control is simplified.

The present invention also includes the power supplying device and the charging arm of the above-described contact charging system for an electric vehicle.

According to the present invention, the positive electrode power reception unit and the negative electrode power reception unit of the charging arm on the side of the vehicle are brought into contact and charging is carried out with respect to the positive electrode power line and the negative electrode power line, which are fixed above and below on inner surfaces of the V-shaped groove extending along the running direction. Therefore, even if the charging arm swings or rocks in upper and lower directions due to road conditions or braking operations or the like, the distal end part of the charging arm is retained inside the V-shaped groove. Then, during traveling of the electric vehicle while contact charging takes place through the charging arm with respect to the power supplying device, contact is prevented from not being secured. Also, a reduction in size of the contact charging system for an electric vehicle can be achieved.

BRIEF DESCRIPTION OF DRAWINGS

FIG. 1A is a plan view, FIG. 1B is a side view, and FIG. 1C is a front view of a contact charging system for an electric vehicle to which a method of the invention according to an embodiment thereof is applied;

DESCRIPTION OF EMBODIMENTS

Figure 2:
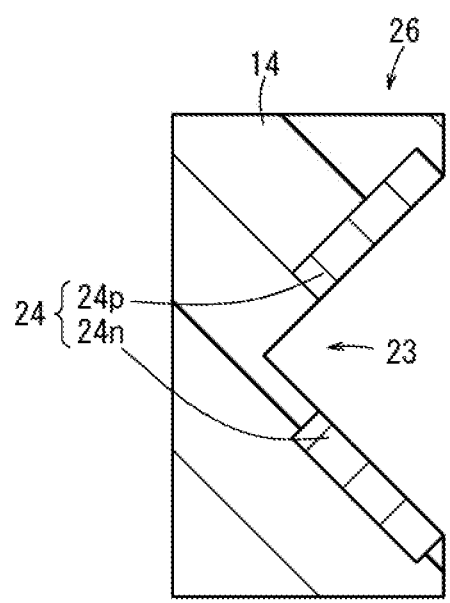
FIG. 2 is a front cross-sectional view with partial omission of a power line retaining part according to a first example that constitutes the contact charging system.

Below, descriptions will be given concerning embodiments of the present invention with reference to the accompanying drawings.

Common Structures

In FIGS. 1A, 1B, 1C, there are shown schematic overall structural views of a contact charging system 12 (first embodiment) for an electric vehicle 10 to which a method of the invention according to an embodiment thereof is applied.

The electric vehicle 10 is a vehicle in which there are mounted an electric motor 110 for vehicle propulsion (shown only in FIG. 1A), and an electrical storage device 100 (shown only in FIG. 1A) for driving the electric motor 110. For example, the electric vehicle 10 corresponds to an electrically driven automobile, a hybrid vehicle equipped with an internal combustion engine, and a fuel cell vehicle equipped with a fuel cell, or the like.

The contact charging system 12 basically is constituted from a power supplying device 26 equipped with a power line retaining part 14 made of an insulating material, and the electric vehicle 10, which is equipped with a charging arm 18 on a side portion 10s of a vehicle body 11. The charging arm 18 may be disposed on both side portions of the electric vehicle 10.

The power supplying device 26 is disposed at a length of a predetermined region on the shoulder of a road (including a high speed expressway) that forms a travel path 70, or on the shoulder of a travel path 70 of an automobile race track, etc. The length of the predetermined region is set to a length within which it is possible for the electric vehicle 10 having a predetermined electrical consumption to be charged with an amount of charge that enables traveling from the position of one power supplying device 26 to the position of a next power supplying device 26.

The electric vehicle 10 travels along the power supplying device 26 on the travel path 70 on which the power supplying device 26 is arranged, and while traveling, charges the electrical storage device 100 from the power supplying device 26 through the charging arm 18.

The power line retaining part 14 extends along the length of the predetermined region, and the rear side thereof is fixed at a predetermined interval on a guard post 20 (see FIG. 1C).

Power lines 24, which are made up from a positive electrode power line 24p of a conductive material to which a DC high voltage is applied from an external power supply apparatus (not shown) and a negative electrode power line 24n of a conductive material, are fixed to the front side of the power line retaining part 14 like a rail. The voltage may be an AC voltage instead of a DC voltage.

On a charging head 34 that forms the distal end part of the charging arm 18, a power reception unit 36 is attached, which is made up from a positive electrode power reception unit 36p that contacts the positive electrode power line 24p, and a negative electrode power reception unit 36n that contacts the negative electrode power line 24n. Both the positive electrode power reception unit 36p and the negative electrode power reception unit 36n are rolling wheels.

For the sake of convenience, the respective constituent elements of the electric vehicle 10 shown in FIGS. 1A, 1B, and 1C are depicted as structural components according to a first example, although the electrical circuitry functions thereof also are the same in the later-described examples.

In FIG. 2, there is shown a front cross-sectional configuration with partial omission of the power line retaining part 14 according to the first example.

Figure 3:
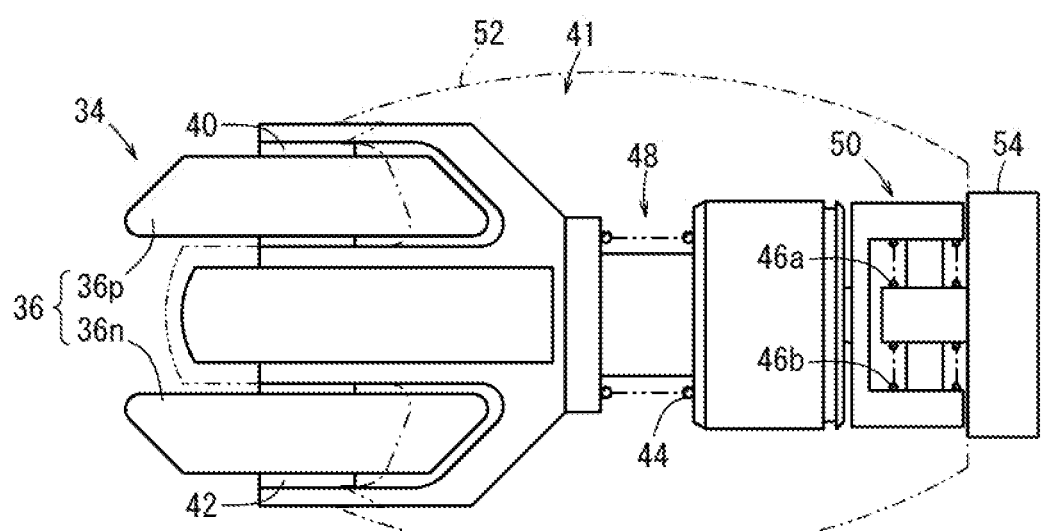
FIG. 3 is a front view with partial omission of a charging head according to the first example that constitutes the contact charging system.

In FIG. 3, there is shown a front configuration with partial omission of the charging head 34 according to the first example.

Figure 4:
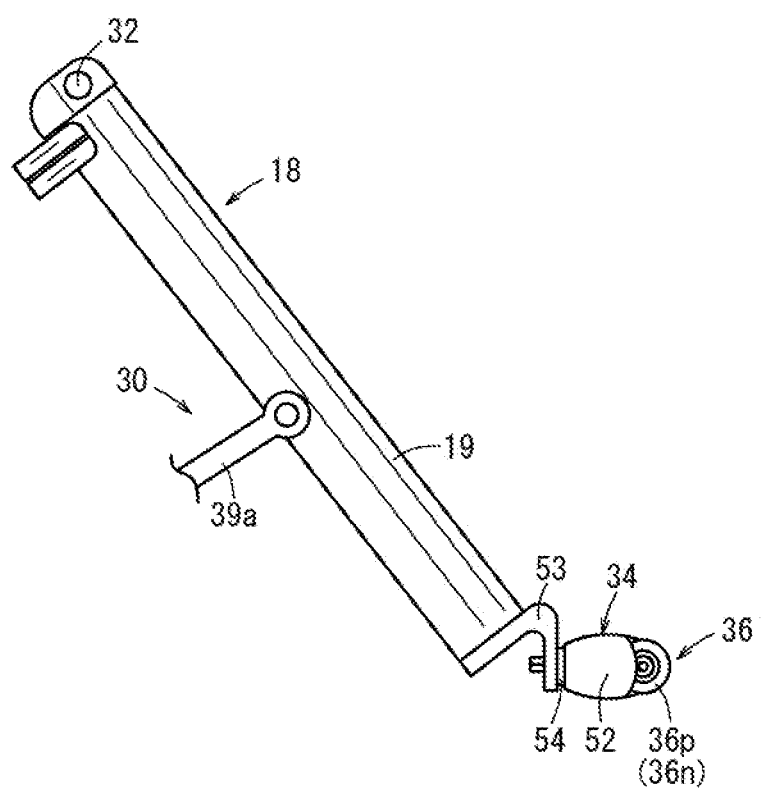
FIG. 4 is a plan view with partial omission of a charging arm according to the first example that constitutes the contact charging system.

In FIG. 4, there is shown a plan configuration with partial omission of the charging arm 18 according to the first example.

Figure 5:
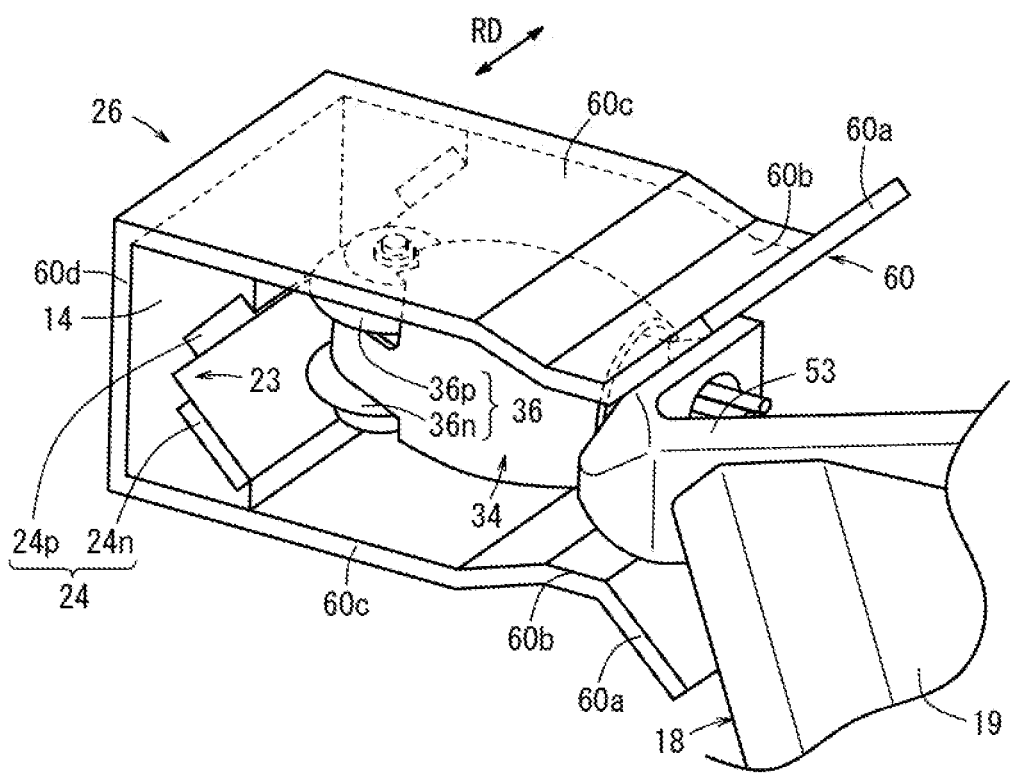
FIG. 5 is a perspective view with partial omission showing a contact condition of the charging arm according to the first example with power lines that are retained in a power line retaining part according to the first example that makes up the contact charging system according to a first embodiment.

In FIG. 5, there is shown in perspective a configuration showing a contact condition of the charging arm 18 with the power lines 24 that are retained in the power line retaining part 14 in the contact charging system 12 according to the first embodiment.

Figure 6:
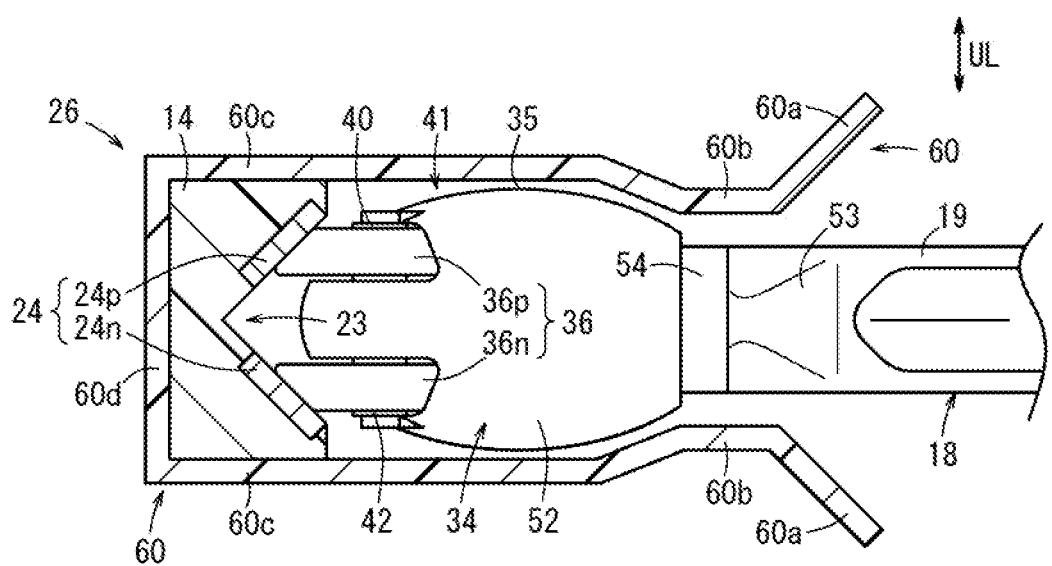
FIG. 6 is a front cross-sectional view with partial omission showing a contact condition of the charging arm according to the first example with power lines that are retained in a power line retaining part according to the first example that makes up the contact charging system according to the first embodiment.

In FIG. 6, there is shown a front configuration showing a contact condition of the charging arm 18 with the power lines 24 that are retained in the power line retaining part 14 in the contact charging system 12 according to the first embodiment.

Below, with reference to FIGS. 1A, 1B, 1C, and 2 through 6, the power line retaining part 14 according to the first example, the charging arm 18 according to the first example, and the contact charging system 12 according to the first embodiment, which is equipped with the power line retaining part 14 and the charging arm 18, will be described in detail.

As shown in FIGS. 1A and 4, the charging arm 18 is constituted from the charging head 34, a substantially L-shaped bracket 53 to which the charging head 34 is attached, and a slider crank mechanism 30 that moves (rotates) the charging head 34 along the directions (q1, q2) of the arrow q through the bracket 53.

The slider crank mechanism 30 is constituted from an arm member 19 that extends between the bracket 53 and a pin 32 (shaft) that is disposed on the vehicle body of the electric vehicle 10, a spring damper 39a, one end of which is attached rotatably to the middle of the arm member 19 and the other end of which is attached rotatably to an actuator 38 that slides on a slide rail 37 in the directions of the arrow p, and a spring damper 39b, one end of which is fixed to the vehicle body and the other end of which is fixed to the actuator 38.

The actuator 38 is biased so as to move on the slide rail 37 in the direction of the arrow p1, whereby the arm member 19 is moved in the direction of the arrow q1 about the center of rotation of the pin 32 through the spring damper 39a, which functions as a lever that swings within a limited range, and the power reception unit 36 of the charging head 34 is urged by the spring dampers 39a, 39b into a state of contact with the power lines 24.

In this manner, the charging arm 18 is extended out (deployed or tilted) toward the side of the power supplying device 26 from the side portion 10s of the electric vehicle 10. More specifically, the charging arm 18 is extended in a lateral outward direction of the vehicle body 11.

On the other hand, by urging the actuator 38 on the slide rail 37 in the direction of the arrow p2, the arm member 19 is moved in the direction of the arrow q2, and the charging head 34 is returned to the home position of the vehicle body 11.

The charging head 34 is attached on one end of the bracket 53 to a head main body 41 through an attachment member (see FIG. 3). The head main body 41 is generally covered by a casing 52 made of an insulating material, with the exception of the electrical connecting portions of the power reception unit 36.

As discussed above, the power supplying device 26 includes the power line retaining part 14, and a bottom portion of the power line retaining part 14 is fixed to a bottom portion 60d of a channel-shaped induction recess 60 (see FIG. 6) made of a non-conducting material, and is fixed to the guard post 20 through the bottom portion 60d of the induction recess 60 (see FIG. 1C).

In addition to the bottom portion 60d thereof, the induction recess 60 is constituted from guide members 60a, 60b, and 60c. The upper and lower guide members 60c extend in a horizontal direction toward the side of the travel path 70 (road) from upper and lower ends of the bottom portion 60d.

The vertical interval between the upper and lower guide members 60c is formed by an interval having a redundancy with respect to the outer diameter of a casing 35 (see FIG. 6) of the charging head 34. The upper and lower guide members 60c are connected contiguously with the upper and lower guide members 60b that extend further in the horizontal direction. The vertical interval between the upper and lower guide members 60b is narrowed so as to be smaller than the outer shape of the casing 35 of the charging head 34. The upper and lower guide members 60b are connected contiguously with the upper and lower guide members 60a, which widen in upper and lower directions UL. The interval of the open ends of the guide members 60a is set to an interval whereby the charging head 34 can be guided into the interior of the induction recess 60, even if the charging head 34 swings upwardly and downwardly in the directions UL when the charging arm 18 is extended.

On the front side of the power line retaining part 14, there is provided a V-shaped groove 23 that opens in upper and lower directions UL of the side portion 10s of the electric vehicle 10, and is formed to extend in the running directions RD of the electric vehicle 10.

A rear surface of the positive electrode power line 24p from among the power lines 24 is fixed to one inner surface of the V-shaped groove 23, and a rear surface of the negative electrode power line 24n from among the power lines 24 is fixed to another inner surface of the V-shaped groove 23. The positive electrode power line 24p and the negative electrode power line 24n are fixed by portions thereof being embedded in the power line retaining part 14 at positions to maintain an insulation distance mutually therebetween. Sides of the positive electrode power line 24p and the negative electrode power line 24n that come into contact with the charging head 34 are in the form of a V-shape.

On the other hand, the charging head 34 is equipped with the power reception unit 36 having at upper and lower locations thereof the positive electrode power reception unit (positive electrode roller) 36p and the negative electrode power reception unit (negative electrode roller) 36n, both of which are rolling wheels (rotating rollers), respectively. The positive electrode power reception unit 36p and the negative electrode power reception unit 36n are formed in the shape of truncated cones, respective bottom surfaces of which vertically face one another, and which are symmetrical with respect to the axis of the charging head 34 (arm member 19). More specifically, the contact portions thereof are formed in the shape of wedges that make line contact with the V-shaped groove 23.

The power reception unit 36 is engaged with bearings 40, 42 (see FIG. 3) of the head main body 41. On a rear end of the head main body 41, there are provided, respectively, a vehicle widthwise direction WD suspension 48 constituted by a spring 44, and an upper and lower direction UL suspension 50 constituted by springs 46a, 46b.

The charging head 34 is fixed by the bracket 53 that is formed on the other end of the arm member 19 through an attachment member 54 that constitutes part of the suspension 50 (see FIG. 4).

In the contact charging system 12 according to the first embodiment, which is equipped with the charging arm 18 according to the first example and the power supplying device 26 according to the first example that are constructed basically as described above, when the electric vehicle 10 during traveling thereof reaches a position in the vicinity of the power supplying device 26, the charging arm 18 is urged outwardly in the vehicle widthwise direction WD, and the charging head 34 is guided through the induction recess 60 to the power lines 24, whereupon as shown in FIGS. 1C, 5, and 6, the charging arm 18 and the power supplying device 26 are connected together electrically in a state of contact.

In this manner, the charging arm 18, on which the positive electrode power reception unit 36p and the negative electrode power reception unit 36n are provided above and below on the distal end thereof, is extended out in a lateral or sideways direction of the vehicle body 11, and by being placed in contact with the power lines 24 that are disposed along the running directions RD of the travel path 70, the electrical storage device 100 for driving, which is mounted in the electric vehicle 10, can be charged during traveling.

More specifically, a configuration is provided in which the positive electrode power reception unit 36p of the charging arm 18 and the positive electrode power line 24p of the power supplying device 26, and the negative electrode power reception unit 36n of the charging arm 18 and the negative electrode power line 24n of the power supplying device 26, wherein the positive electrode power line 24p is fixed to one inner surface and the negative electrode power line 24n is fixed to another inner surface of the V-shaped groove 23 that faces toward the side portion 10s of the electric vehicle 10 and is formed to open in upper and lower directions UL of the electric vehicle 10 and to extend along the running directions RD of the electric vehicle 10, are brought into contact simultaneously, and the electrical storage device 100 for driving of the electric vehicle 10 is charged. Therefore, even if the charging arm 18 swings or rocks in upper and lower directions UL due to road conditions of the travel path 70 or braking operations or the like, the charging head 34 that defines the distal end part of the charging arm 18 is retained inside the V-shaped groove 23 under the action of the suspension 50, etc., and contact is prevented from not being secured.

Further, because the positive electrode power line 24p and the negative electrode power line 24n are fixed above and below on inner surfaces of the V-shaped groove 23, both the power supplying device 26 and the charging arm 18 can be made smaller in scale, and as a result, it is possible for the contact charging system 12 as a whole to be made smaller in scale.

Moreover, as shown in FIG. 1B, springs also are interposed in upper and lower directions UL on the pin 32 (shaft), whereby the charging arm 18 functions as a suspension in the upper and lower directions UL.

Below, descriptions will be given concerning second through fourth embodiments. In the drawings to be referred to below, the same features or corresponding features to those shown in FIGS. 1 through 6 are denoted by the same reference numerals, or by the reference numerals in which hundredth place digits have been added to the same reference numerals, and detailed descriptions of such features are omitted. Further, since the slider crank mechanism 30, by which the charging arm 18 extends out laterally or is accommodated on the side of the vehicle body, utilizes the same structure as that shown in FIG. 1A, detailed description thereof is omitted.

Second Embodiment

Figure 7:
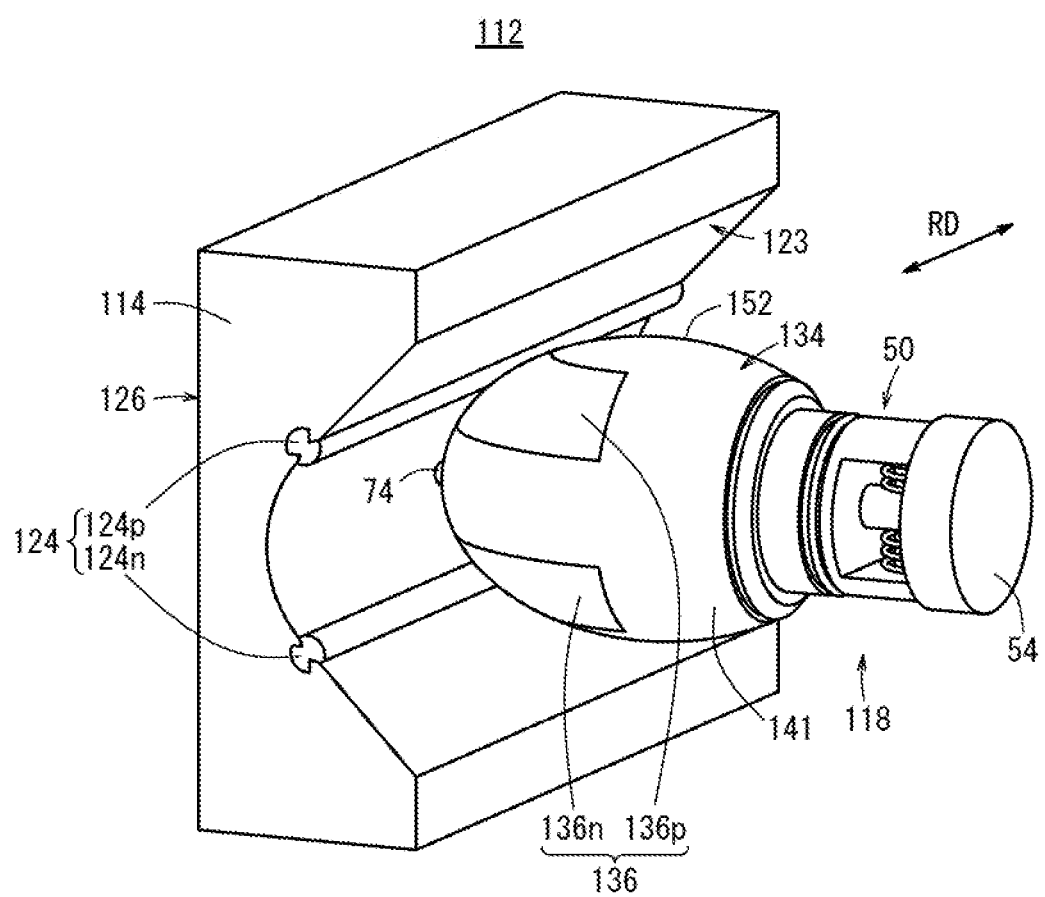
FIG. 7 is a perspective view of a contact condition of the charging arm according to a second example with power lines that are retained in a power line retaining part according to the second example, which makes up a contact charging system according to a second embodiment.
Figure 8:
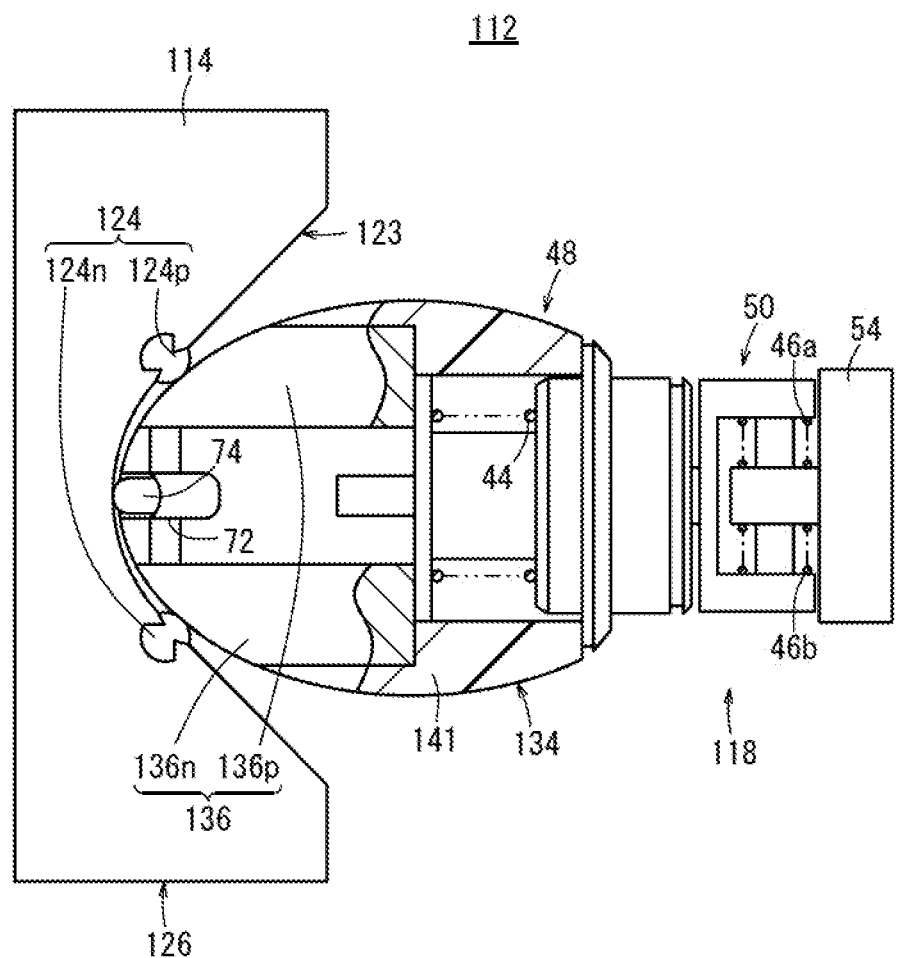
FIG. 8 is a front cross-sectional view with partial omission showing a contact condition of the charging arm according to the second example with power lines that are retained in a power line retaining part according to the second example that makes up the contact charging system according to the second embodiment.

In FIGS. 7 and 8, there is shown a state of engagement (contact condition) of a charging head 134 according to a second example that constitutes a charging arm 118 according to the second example with power lines 124 that are retained in a power line retaining part 114 according to the second example. The power line retaining part 114 and the charging arm 118 are included in a contact charging system 112 according to the second embodiment.

The charging head 134 is equipped with a power reception unit 136 made up from a positive electrode power reception unit 136p and a negative electrode power reception unit 136n having halves of truncated conical shapes, which are embedded with the exception of front surfaces thereof by way of resin molding in a resin material head main body 141. The positive electrode power reception unit 136p and the negative electrode power reception unit 136n do not undergo rolling, unlike the positive electrode power reception unit 36p and the negative electrode power reception unit 36n of the charging head 34 shown in FIG. 6. Thus, they can also be considered as the configuration in the form of sliding plate-like shapes.

A rolling wheel 74 is attached to a bearing 72 on the distal end of the charging head 134. The rolling wheel 74 is adapted to roll in the running directions RD along a surface of the power line retaining part 114, in which a groove-shaped bottom portion of a V-shaped groove 123 is in the form of a U-shaped groove.

In the power line retaining part 114, on one inner surface of the V-shaped groove 123, there is fitted a rear surface side projection of a positive electrode power line 124p having a gourd shape in cross section (a shape generally in the form of an oval with a constricted or narrowed center portion), and on the other inner surface thereof, there is fitted a rear surface side projection of a negative electrode power line 124n. The front sides of the positive electrode power line 124p and the negative electrode power line 124n are formed with semicircular shapes in cross section (i.e., with a rounded bar shape with respect to the running directions RD).

While the rolling wheel 74 of the charging arm 118 rolls along the U-shaped groove of the groove-shaped bottom portion of the V-shaped groove 123, the positive electrode power line 124p of the power line retaining part 114 and the positive electrode power reception unit 136p of the charging head 134 undergo sliding contact by way of point contact, and together therewith, the negative electrode power line 124n of the power line retaining part 114 and the negative electrode power reception unit 136n of the charging head 134 undergo sliding contact by way of point contact, whereby the electrical storage device 100 for driving of the electric vehicle 10 is charged from a power supplying device 126 through the power lines 124 and the charging arm 118.

Third Embodiment

Figure 9:
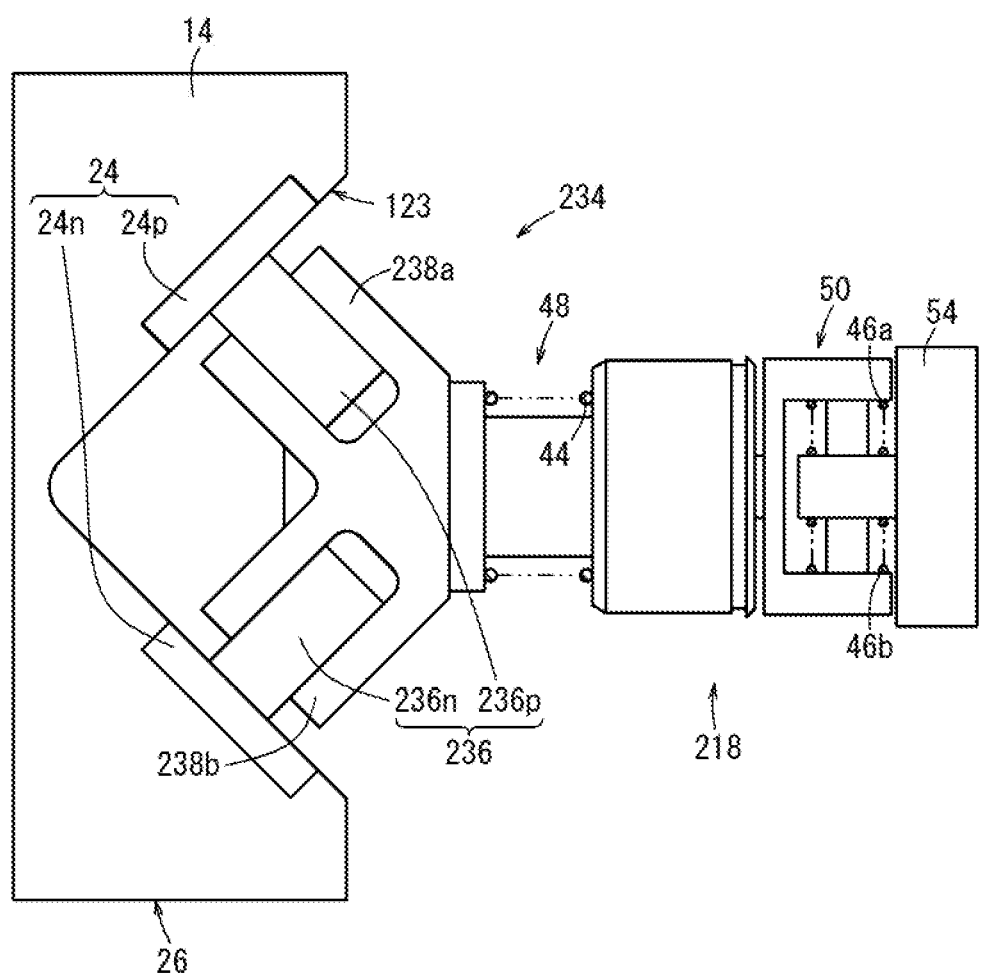
FIG. 9 is a front view showing a contact condition of the charging arm according to a third example with power lines that are retained in a power line retaining part according to the first example that makes up the contact charging system according to a third embodiment.
Figure 10:
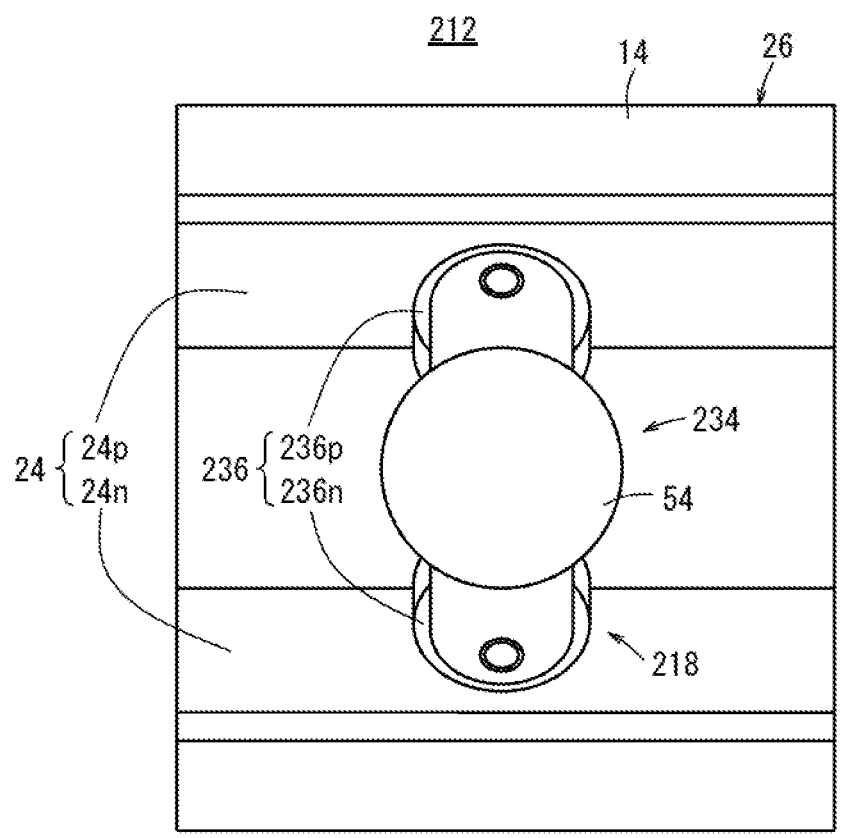
FIG. 10 is a side view showing a contact condition of the charging arm according to the third example with power lines that are retained in a power line retaining part according to the first example that makes up the contact charging system according to the third embodiment.

In FIGS. 9 and 10, there is shown a state of engagement (contact condition) of a charging head 234 according to a third example that constitutes a charging arm 218 according to the third example with the power lines 24 that are retained in the power line retaining part 14 according to the first example. The power line retaining part 14 and the charging arm 218 are included in a contact charging system 212 according to the third embodiment. The distal end of the charging head 234 opens expansively in a reverse V-shape, and power reception units 236 made up from a positive electrode power reception unit 236p and a negative electrode power reception unit 236n, which are cylindrically shaped rolling wheels, are attached to retaining members 238a, 238b of the reverse V-shape. By the positive electrode power reception unit 236p and the negative electrode power reception unit 236n sliding in line contact while rolling respectively on the positive electrode power line 24p and the negative electrode power line 24n, the electrical storage device 100 for driving of the electric vehicle 10 is charged from the power supplying device 26 through the charging head 234.

Figure 11:
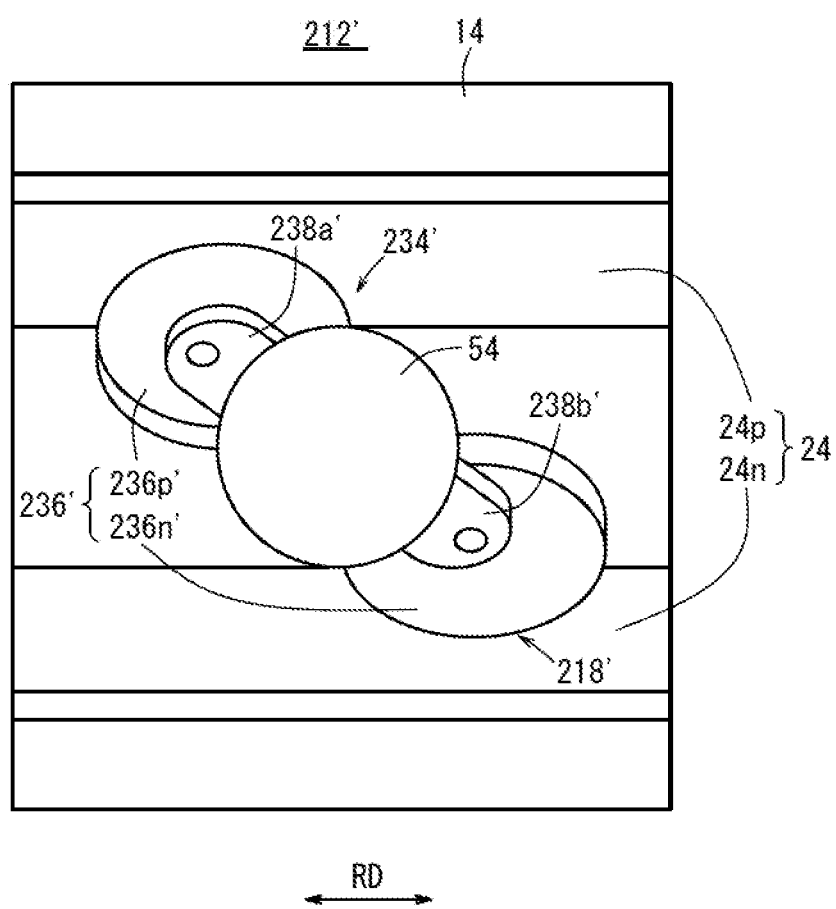
FIG. 11 is a side view showing a contact condition of the charging arm according to a modification of the third example with power lines that are retained in a power line retaining part according to the first example that makes up the contact charging system according to the modification of the third embodiment.
Figure 12:
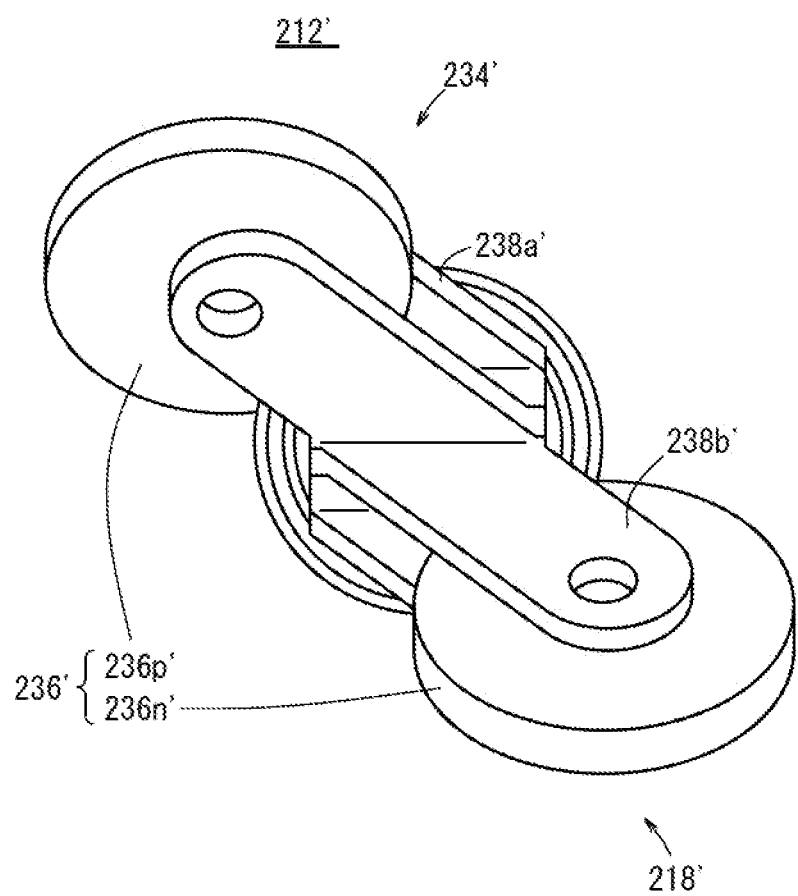
FIG. 12 is a side view of the charging arm according to the modification of the third example that makes up the contact charging system according to the modification of the third embodiment.

FIGS. 11 and 12 show a contact condition of a charging head 234' according to a modification of the third example with the power lines 24 that are retained in the power line retaining part 14 according to the first example. The power line retaining part 14 and the charging head 234' are included in the contact charging system 212' according to a modification of the third embodiment. The charging head 234' is in the form of a reverse V-shape, and upper and lower retaining members 238a', 238b' thereof are offset with respect to the running directions RD.

A power reception unit 236' made up from a positive electrode power reception unit 236p' and a negative electrode power reception unit 236n', which are cylindrically shaped rolling wheels, are attached to the offset upper and lower retaining members 238a', 238b'. By the positive electrode power reception unit 236p' and the negative electrode power reception unit 236n' sliding in line contact while rolling respectively on the positive electrode power line 24p and the negative electrode power line 24n, the electrical storage device 100 for driving of the electric vehicle 10 is charged from the power supplying device 26 through the charging head 234'.

Because the positive electrode power reception unit 236p' and the negative electrode power reception unit 236n' are attached in an offset manner in forward and rearward directions of the running directions RD, compared with the charging head 234 of the example of FIGS. 9 and 10, the pitching behavior of the charging head 234' in the direction of movement (the running directions RD of the electric vehicle 10) of the charging head 234' is stabilized.

Fourth Embodiment

Figure 13:
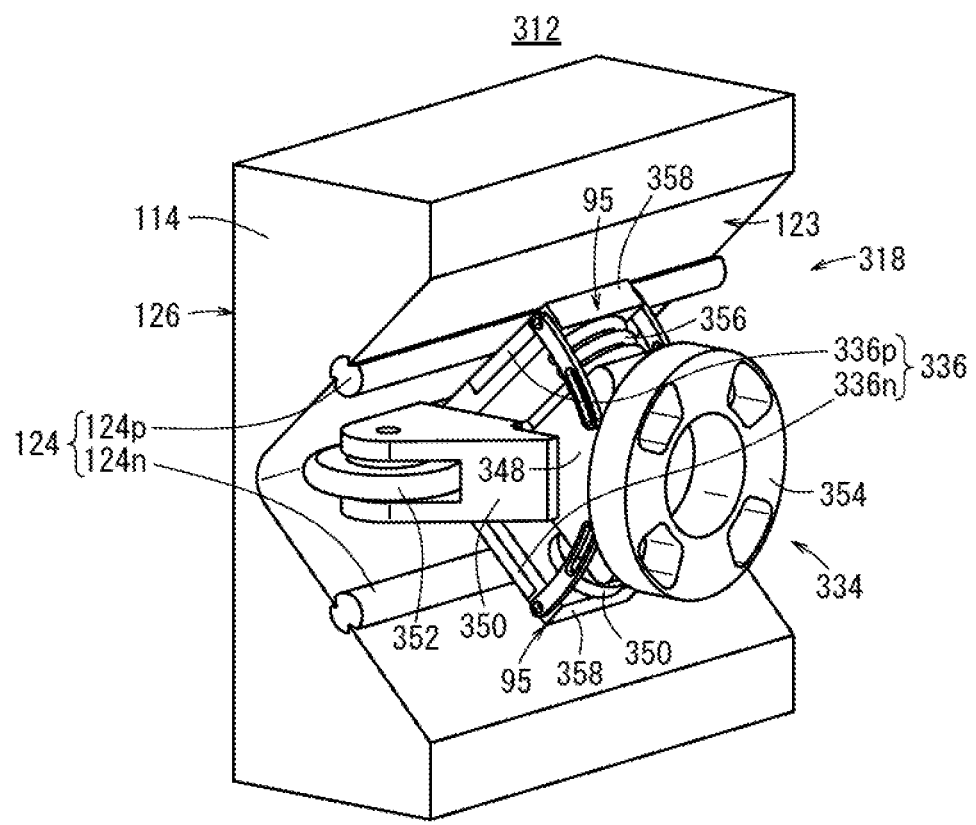
FIG. 13 is a perspective view of a contact condition of the charging arm according to a fourth example with power lines that are retained in a power line retaining part according to the second example that makes up the contact charging system according to a fourth embodiment.
Figure 14:
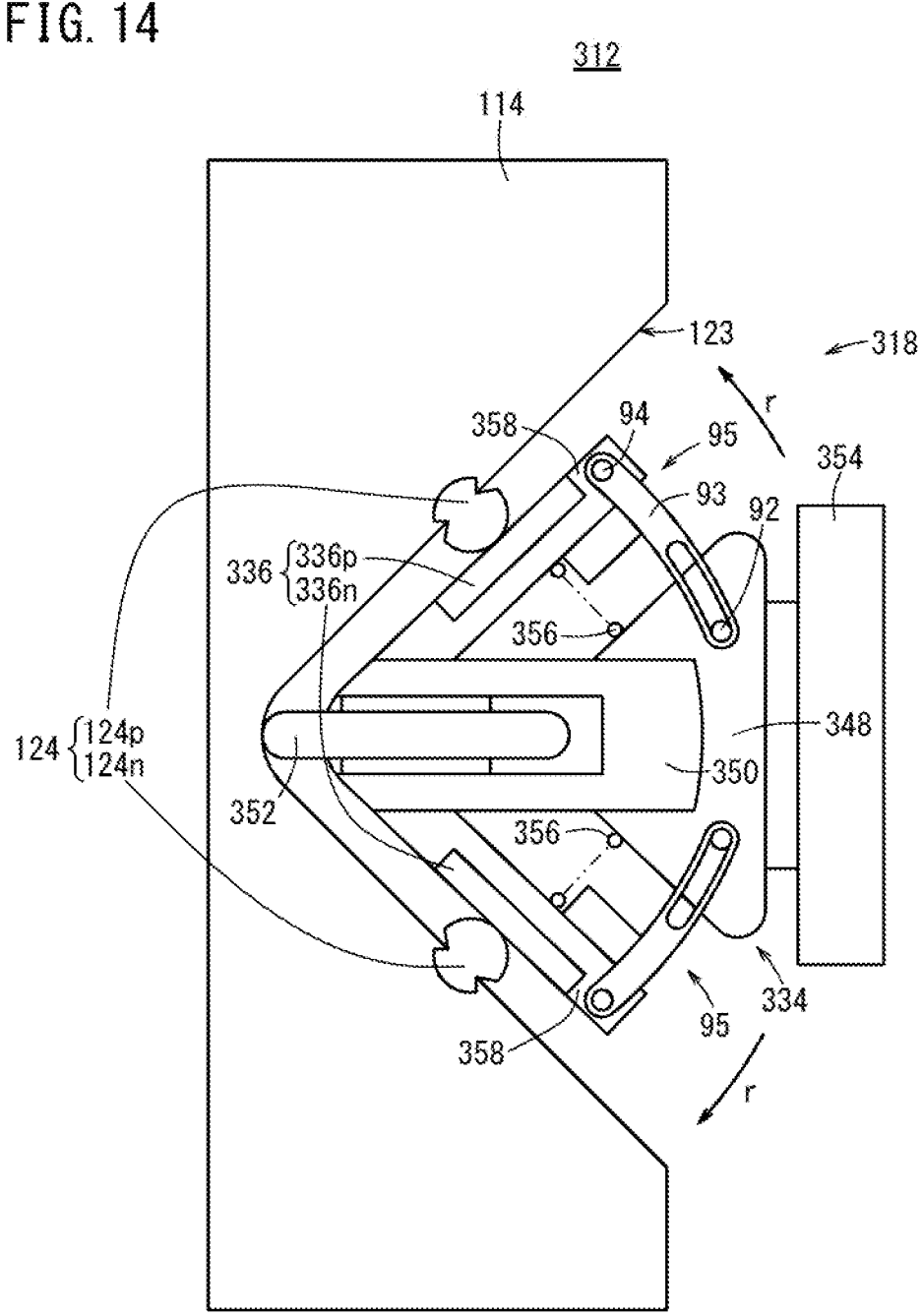
FIG. 14 is a front view showing a contact condition of the charging arm according to the fourth example with power lines that are retained in a power line retaining part according to the second example that makes up the contact charging system according to the fourth embodiment.
Figure 15:
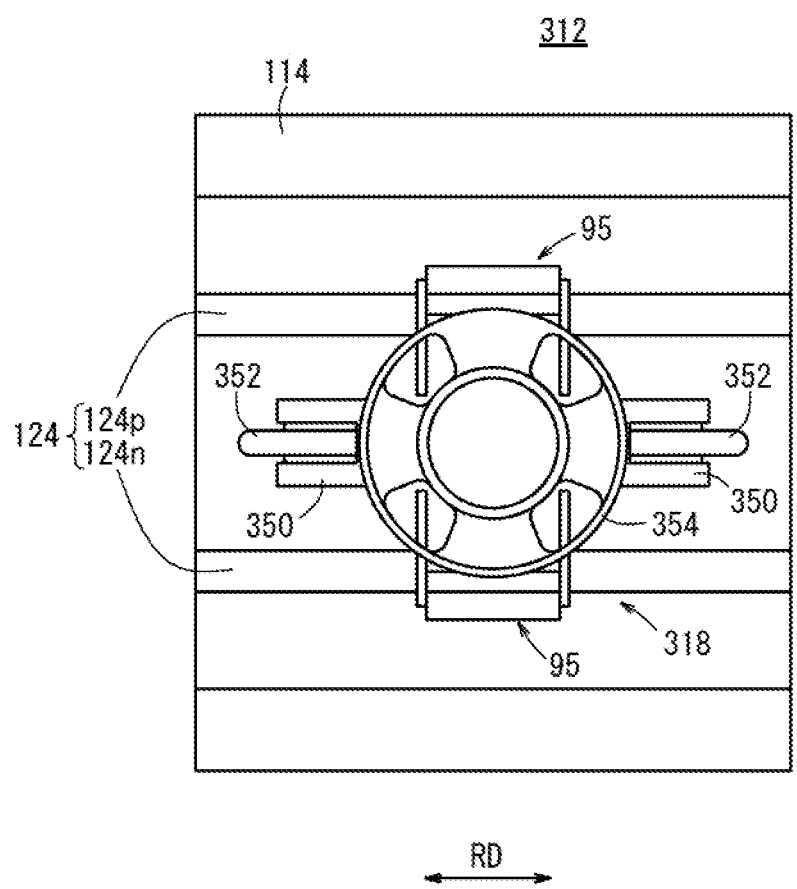
FIG. 15 is a side view showing a contact condition of the charging arm according to the fourth example with power lines that are retained in a power line retaining part according to the second example that makes up the contact charging system according to the fourth embodiment.

In FIGS. 13, 14, and 15, there is shown a contact condition of a charging head 334 according to a fourth example that constitutes a charging arm 318 according to a fourth example with the power lines 124 that are retained in the power line retaining part 114 according to the second example. The power line retaining part 114 and the charging arm 318 are included in a contact charging system 312 according to a fourth embodiment.

The charging head 334 includes a base section 348 shaped in the form of a triangular prism. An attachment member 354 is mounted on one side surface of the base section 348, and rolling wheels 352 are attached through attachment members 350 to ends on upper and lower surfaces (in directions perpendicular to the sheet in FIG. 14) of the base section 348.

Further, attachment plates 358 to which a power reception unit 336 is attached are disposed in parallel on both remaining side surfaces of the base section 348. The power reception unit 336 includes a positive electrode power reception unit 336p and a negative electrode power reception unit 336n, which are biased respectively through springs 356 toward a side of the positive electrode power line 124p and toward a side of the negative electrode power line 124n.

The attachment plates 358 are biased by the springs 356 toward the sides of the power lines 124 about respective supporting shafts disposed between facing surfaces of the attachment members 350 on the sides of the rolling wheels 352.

More specifically, the attachment plates 358 are urged in the directions of the arrows r, together with movement thereof being regulated by spring mechanisms 95 made up from the springs 356, pins 94, regulating members 93, and pins 92.

In the charging head 334 according to the fourth example, while the rolling wheels 352 roll along a U-shaped groove of the V-shaped groove 123 in which the groove-shaped bottom portion thereof is in the form of a U-shaped groove, the positive electrode power reception unit 336p is kept in contact by a compression force of the spring 356 with respect to the positive electrode power line 124p, and together therewith, the negative electrode power reception unit 336n is kept in contact by a compression force of the spring 356 with respect to the negative electrode power line 124n, whereby the electrical storage device 100 for driving of the electric vehicle 10 is charged from the power supplying device 126 through the charging head 234.

Summary of Embodiments

As described above, according to the aforementioned embodiments, for example as shown in FIGS. 1A, 1B, 1C, and 6, a configuration is provided comprising the power supplying device 26, which includes the power line retaining part 14 in which the V-shaped groove 23 is provided that faces toward the side portion 10s of the electric vehicle 10 and is formed to open in upper and lower directions UL of the electric vehicle 10 and to extend in the running directions RD of the electric vehicle 10, and the positive electrode power line 24p on one inner surface and the negative electrode power line 24n on another inner surface of the V-shaped groove 23 that makes up the power line retaining part 14 are fixed to the power line retaining part 14 respectively along the running directions RD and at positions to maintain an insulation distance mutually therebetween. In addition, the charging arm 18, which is accommodated in the side portion 10s of the electric vehicle 10 and includes the positive electrode power reception unit 36p and the negative electrode power reception unit 36n, which are provided on a distal end thereof and are disposed so as to face the corresponding positive electrode power line 24p and the negative electrode power line 24n of the power supplying device 26, is made to extend out in a vehicle widthwise direction WD, and to bring into contact simultaneously the positive electrode power line 24p of the power supplying device 26 and the positive electrode power reception unit 36p of the charging arm 18, and the negative electrode power line 24n of the power supplying device 26 and the negative electrode power reception unit 36n of the charging arm 18, so as to charge the electrical storage device 100 for driving of the electric vehicle 10. Therefore, even if the charging arm 18 swings or rocks in upper and lower directions UL due to road conditions or braking operations or the like, the charging head 34 that defines the distal end part of the charging arm 18 is retained inside the V-shaped groove 23, and contact is prevented from not being secured.

Further, because the positive electrode power line 24p and the negative electrode power line 24n are fixed above and below on inner surfaces of the V-shaped groove 23, both the power supplying device 26 and the charging arm 18 can be made smaller in scale, and as a result, it is possible for the contact charging system 12 as a whole to be made smaller in scale.

The present invention is not limited to the above-described embodiments, and it goes without saying that various configurations could be adopted therein, based on the content disclosed in the present specification.

The invention claimed is:

1. An electric vehicle comprising a charging arm accommodated in a side portion of the electric vehicle and having a charging head including an electrode power reception unit at a position facing toward a corresponding power line of a power supplying device, the charging arm being configured to extend out in a vehicle widthwise direction so that the electrode power reception unit contacts with the corresponding power line of the power supplying device provided at a position facing the side portion of the electric vehicle along a running direction of the electric vehicle to charge an electrical storage device for driving in the electric vehicle, wherein the charging head of the charging arm is attached to a front end of an arm member configured to extend in the vehicle widthwise direction, the charging head of the charging arm is joined to the arm member through a first suspension formed of springs attached respectively to upper and lower sides of the arm member, the electrode power reception unit is partially covered by a casing, and the charging head comprises a third suspension elastically deformable in the vehicle widthwise direction such that the third suspension urges the charging head outwardly in the vehicle widthwise direction, and the electrode power reception unit has only a positive electrode power reception unit and a negative electrode power reception unit for power reception.

2. The electric vehicle according to claim 1, wherein the arm member is configured to rotate about a shaft positioned on the side portion of the electric vehicle and extend in the vehicle widthwise direction, and a second suspension elastically deformable in upper and lower directions is provided to the shaft.

3. The electric vehicle according to claim 1, wherein the first suspension is provided at one end of the charging head on a side of the arm member.

4. The electric vehicle according to claim 3, wherein the charging head is fixed through an attachment member to a bracket formed at a distal end of the arm member.

5. A contact charging system for an electric vehicle comprising a power supplying device and the electric vehicle having an electrical storage device for driving to be charged with an electric power from the power supplying device, wherein the power supplying device faces toward a side portion of the electric vehicle and includes a power line fixed along a running direction of the electric vehicle, the electric vehicle includes a charging arm accommodated in the side portion of the electric vehicle and having a charging head including an electrode power reception unit at a position facing toward the corresponding power line of the power supplying device, the charging arm being configured to extend out in a vehicle widthwise direction, the charging head of the charging arm is attached to a front end of an arm member configured to extend in the vehicle widthwise direction, the charging head of the charging arm is joined to the arm member through a first suspension formed of springs attached respectively to upper and lower sides of the arm member, the electrode power reception unit is partially covered by a casing, and the charging head comprises a third suspension elastically deformable in the vehicle widthwise direction such that the third suspension urges the charging head outwardly in the vehicle widthwise direction, and the electrode power reception unit has only a positive electrode power reception unit and a negative electrode power reception unit for power reception.

6. The contact charging system according to claim 5, wherein the arm member is configured to rotate about a shaft positioned on the side portion of the electric vehicle and extend in the vehicle widthwise direction, and a second suspension elastically deformable in upper and lower directions is provided to the shaft.

7. The contact charging system according to claim 5, wherein the first suspension is provided at one end of the charging head on a side of the arm member.

8. The contact charging system according to claim 7, wherein the charging head is fixed through an attachment member to a bracket formed at a distal end of the arm member.

\* \* \* \* \*